Feb. 14, 1967     F. M. MEDWEDEFF     3,304,423
DENTAL X-RAY SHIELD AND AIMING MEANS AND FILM HOLDER
MEANS MOUNTED ON OPPOSITE ENDS OF BITE MEANS
Filed March 25, 1966     3 Sheets-Sheet 1

INVENTOR.
FRED M. MEDWEDEFF

By *[signature]*
ATTORNEY

Feb. 14, 1967   F. M. MEDWEDEFF   3,304,423
DENTAL X-RAY SHIELD AND AIMING MEANS AND FILM HOLDER
MEANS MOUNTED ON OPPOSITE ENDS OF BITE MEANS
Filed March 25, 1966   3 Sheets-Sheet 2

INVENTOR.
FRED M. MEDWEDEFF
By
ATTORNEY

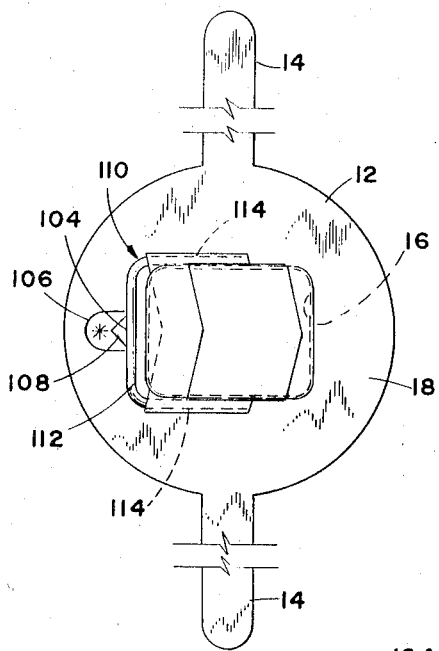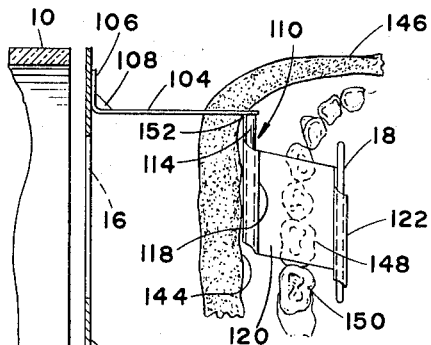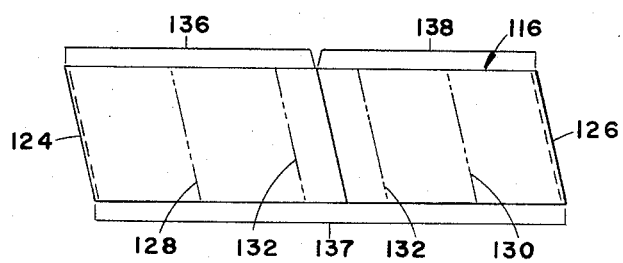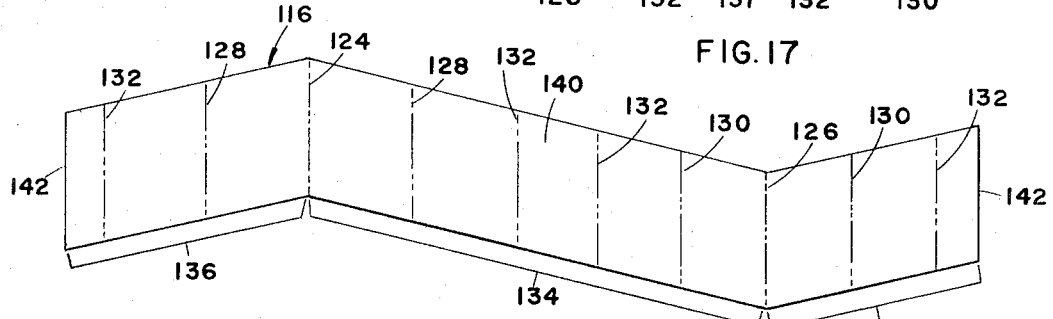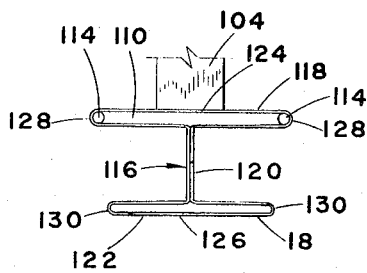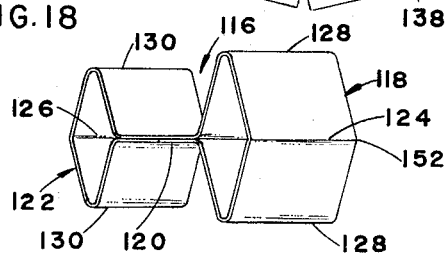

United States Patent Office 3,304,423
Patented Feb. 14, 1967

3,304,423
DENTAL X-RAY SHIELD AND AIMING MEANS AND FILM HOLDER MEANS MOUNTED ON OPPOSITE ENDS OF BITE MEANS
Fred M. Medwedeff, 4505 Wayland Drive, Nashville, Tenn. 37215
Filed Mar. 25, 1966, Ser. No. 544,640
11 Claims. (Cl. 250—70)

This application is a continuation-in-part of application, Serial No. 376,957, filed June 22, 1964, now abandoned.

This invention pertains to an X-ray shield and film holder for use in taking dental X-rays. The shield also facilitates the aiming of the cone of an X-ray machine relative to the film held by the combination X-ray shield and film holder.

More particularly, the X-ray shield and film holder comprising the present invention constitutes an improvement over the X-ray film holder and aiming element comprising the subject matter of Patent No. 3,092,721, issued June 4, 1963, in which the applicant is one of the co-inventors in said patent. Whereas the several embodiments of X-ray film holders and aiming elements disclosed in said prior patents are effective and useful, the means for connecting the X-ray film holder with the aiming element in said various embodiments preferably are rigid and metallic, though suitable plastic is mentioned as an alternative. The principal, desired method of supporting said X-ray film holder and aiming elements of these various embodiments in said patent is through the expedient of disposing a portion of the rigid connecting arm between the film holder and aiming element between the teeth in opposing jaws of the patient. In view of the positioning of a rigid object of appreciable thickness between said teeth, especially in the immediate vicinity of the X-ray film as contemplated in said patent, it has been found under certain circumstances to interfere with the taking of X-ray film pictures and also waste film space by opening the bite, particularly when using bitewing film.

In view of the foregoing aspects of the various embodiments of said prior patent, it is the principal object of the present invention to obviate the difficulties referred to above by positioning the supporting bracket means in totally non-interfering position between the X-ray shield and film holder and, in addition, the positioning of the film holder with respect to the teeth of a patient is effected by using preferably thin, non-metallic means such as paper, which are engaged between the opposed teeth of the patient when substantially in bite-registering relationship, whereby accurate positioning of the film is assured without film waste or interference of any kind with the taking of desirable X-ray film pictures.

Another object of the invention is to provide several embodiments of improved and novel connecting means between the bracket extending from the X-ray shield and aiming element, and the X-ray film holder.

Ancillary to the foregoing object, it is a further object of the invention to provide preferably flexible as well as non-metallic and inexpensive expendable connecting means between the bracket of the X-ray shield and the film holder, at least certain embodiments thereof being capable of being connected permanently to the X-ray film, if desired, whereby the same may be fabricated with the film by the film manufacturer.

Still another object of the invention is to provide one embodiment of bracket of the X-ray shield and aiming element which is shaped so that an extension on the outer end thereof conforms substantially to the shape of the buccal or labial surfaces of the jawbone of a patient and another embodiment of bracket which is not so shaped but the extension thereon is shorter to provide patient comfort, said extensions being connectable respectively to several different embodiments of connecting means by which the film holders are secured to said brackets in accordance with the principles of the invention.

Details of the foregoing objects and of the invention, as well as other objects thereof, are set forth in the following specification and illustrated in the accompanying drawings comprising a part thereof.

In the drawings:

FIG. 15 is a front face view of another embodiment of X-ray shield and aiming element having certain differences over the embodiment shown in the preceding figures.

FIG. 16 is a horizontal sectional view of the fragmentary anatomy of a patient's jaw illustrating the embodiment of X-ray shield and aiming element shown in FIG. 15 positioned relative thereto in an exemplary position of use.

FIG. 17 is a plan view of a flattened connecting means including the principles of the embodiment of the invention shown in FIGS. 15 and 16.

FIG. 18 is a plan view of a blank from which the embodiment of connecting means shown in FIG. 17 is formed.

FIG. 19 is an end view of the embodiment of connecting means shown in FIGS. 15–18 by which an X-ray film is secured to the bracket of the X-ray shield and aiming element.

FIG. 20 is a perspective view of the connecting means shown in FIG. 19.

Figure 1:
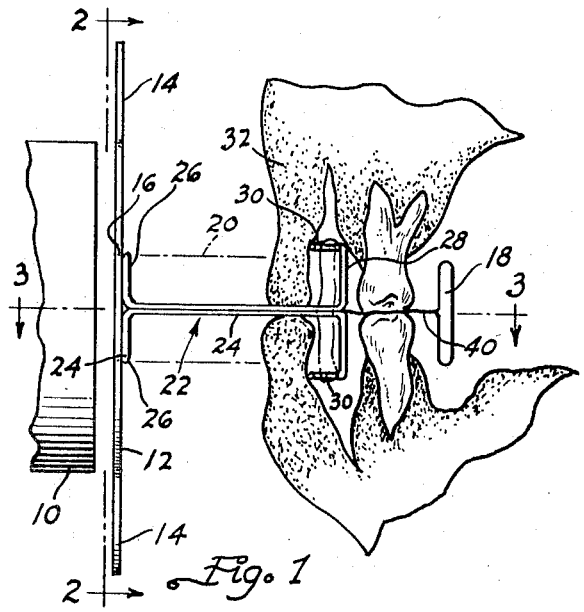
FIG. 1 is a fragmentary side elevation of one embodiment of a combination X-ray shield and film holder embodying the principles of the present invention and positioned relative to a fragmentarily illustrated, vertical section of one side of a patient's face and supported in operative position by novel means of the present invention between opposing teeth of the patient.

The dental X-ray shield of the present invention as illustrated in the drawings is for use in conjunction with the front nose of a long cone X-ray machine and primarily is for purposes of directing the effective X-rays upon the teeth or jaw portions intended to be X-rayed. This is accomplished in an intentional manner by which the shield absorbs and, therefore, prevents X-rays of the primary beam from contacting any human tissues not intended to be X-rayed. As a result, the only X-rays which actually contact the tissues, bone or tooth structures intended to be X-rayed are those which are permitted by design to pass through an opening of desired size, arranged preferably centrally in the shield member, and substantially of an area which either is coextensive with or slightly smaller in shape and size than the X-ray film.

The foregoing arrangement greatly minimizes possible injury to the patient from any scattered and surplus primary X-rays which, without the aid of an X-ray shield of the type provided by the present invention, and as currently experienced in conventional X-ray techniques, frequently cause the patient to sustain undue exposure by X-rays to such critical organs of the anatomy as the patient's thyroid, pituitary, tongue, brain and eyes, the tissues of which are often in the path of the primary beam when employing conventional X-ray techniques.

Particularly in subjecting children to dental X-rays and considering the fact that human beings in general are subjected to a far greater number of dental X-rays than X-rays applied to other portions of the human anatomy in the course of a lifetime, it has been found that harmful effects can and have arisen from undue exposure of such critical parts of the anatomy as enumerated above to scattered and surplus X-rays administered by dentists and technicians incident to X-raying teeth and bone and gum tissues of the human head.

In order to minimize such dangerous exposure of said tissues especially within the head of a patient, the various embodiments of X-ray film holder and shield structures covered by prior Patent No. 3,092,721 were developed and at least the shield portion of the invention described and claimed in said patient is highly effective to absorb all by a negligible amount of the scattered and surplus primary X-rays through the provision of a metallic shield of such area that it extends entirely across either a long or short cone and either a blunt or pointed nose cone of dental X-ray machines, the central portion of said shield having in it an opening only of such area and shape as to conform substantially to the confines of an X-ray film supported by said shield member, said opening not only passing the required area of X-rays therethrough for purposes of the film being exposed thereto, but said opening also aiding in aiming the cone of the X-ray machine toward said film.

Referring to the apparatus specifically illustrated in the various figures of the drawings, an exemplary outer end of a long cone 10 is shown in FIG. 1, it being understood that said cone extends from an X-ray machine and, without the use of the present invention, normally would be directed generally toward the portion of the jaw of the patient which is to be X-rayed and the discharge from said cone would engage an X-ray film held against the opposite sides of the jaw or teeth which are to be X-rayed either by the finger of the patient, in connection with periapical-type film, or by the wings of a bitewing type film being held between opposing teeth of the patient. Under such circumstances, a very substantial amount of scattered and surplus primary X-rays pass through the human tissue other than those which are necessary solely for purposes of X-raying a desired area of the anatomy commensurate with the size and shape of the X-ray film.

Figure 2:
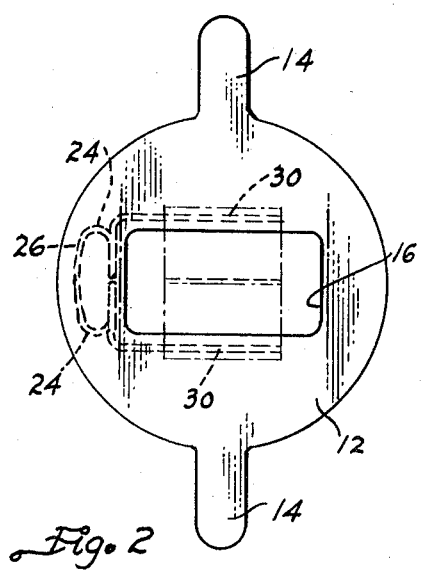
FIG. 2 is a front face view of the X-ray shield and aiming element as seen on the line 2—2 of FIG. 1.
Figure 8:
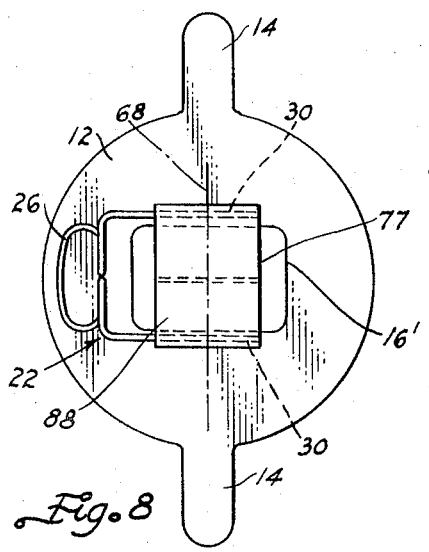
FIG. 8 is a rear face view of the X-ray shield and aiming element shown with connecting means connected to the bracket means and centered relative to one size of opening in the shield and aiming element.
Figure 9:
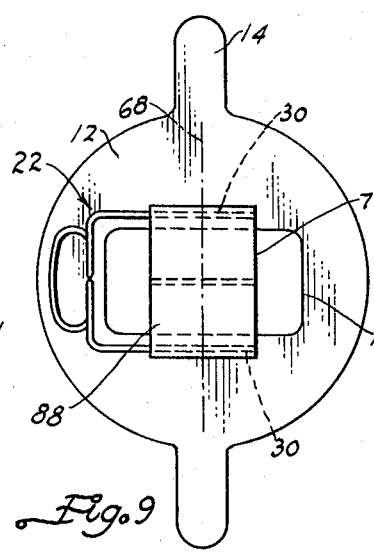
FIG. 9 is a view similar to FIG. 8 but showing the same type of connecting means centered relative to a different size of opening in the shield and aiming element from that shown in FIG. 8.
Figure 10:
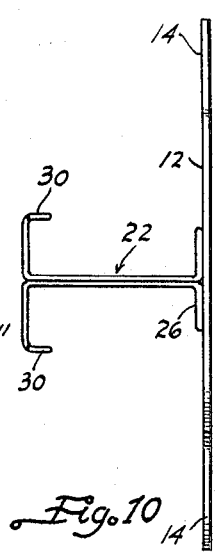
FIG. 10 is a side view of the X-ray shield and aiming element and bracket thereon as shown in FIGS. 8 and 9.

In accordance with the present invention therefor, a combination X-ray shield and aiming means or member 12 is provided which, in the preferred construction, as is best seen from FIGS. 2, 8 and 9, is substantially circular. Extending preferably diametrically from opposite sides of the shield 12 are a pair of handles 14, one of which is held by the patient during an X-raying operation so as to position the shield 12 substantially coaxially with the X-ray cone 10 as shown in exemplary manner in FIG. 1.

The shield 12, in accordance with the present invention, is metallic and of such composition as to be capable of absorbing a very high percentage of the scattered and excess X-rays which do not pass through opening 16 formed preferably substantially centrally of the shield 12. One highly suitable type of material from which the shield 12 may be made is sheet-type stainless steel of appropriate thickness such as of the order of approximately 1/16 inch. The shield very conveniently may be formed by a blanking die which simultaneously shapes the exterior as well as forms the opening 16 in the combination shield and aiming member 12. Other suitable materials such as sheet lead, brass, or any other metal having the mass adequate to render it radiopaque, either with or without auxiliary support may be used, if desired.

It is to be understood that the area and shape of the opening 16 conforms closely to that of the X-ray film 18 which, in the exemplary illustration shown in FIGS. 1 and 3, and FIGS. 15 and 16, is film not having attached bitewing tabs but used for bitewing views, as distinguished from bitewing type film. By means to be described in detail hereinafter, the film 18 is held so as to be transversely centered with respect to the longitudinal axis of the cone 10 and opening 16, whereby as shown in exemplary manner in FIG. 1, a stream of X-rays of substantially any form of concentration pass through the opening 16 and substantially are defined by the exemplary boundary lines 20 shown in FIG. 1, said lines being substantially coextensive, or slightly less, in length and spacing with the upper and lower edges of the film 18, and it is to be understood that corresponding side boundary lines for the X-ray field will be substantially coextensive or slightly less at opposite ends of the film 18, all of said boundaries being defined by the edges of the opening 16 in the shield 12.

Further in accordance with the present invention, attached to the shield and aiming means or member 12 and extending rearwardly, preferably substantially perpendicularly, from the rear face thereof, is one embodiment of bracket means 22 which preferably is relatively rigid and, in accordance with the most desired form of the invention, is formed from suitable material such as stainless steel wire, especially for purposes of facilitating the sterilizing thereof. The wire, for example, may be of the order of 3/32 of an inch in diameter, or perhaps slightly heavier. Such wire-type bracket means are bent preferably to form a pair of arms 24 which are adjacent each other and extend rearwardly from an appropriately bent attaching foot 26 which is spot-welded, silver-soldered or otherwise connected to the inner face of the shield member 12 so as rigidly and permanently to connect the legs 24 of the bracket thereto.

Figure 3:
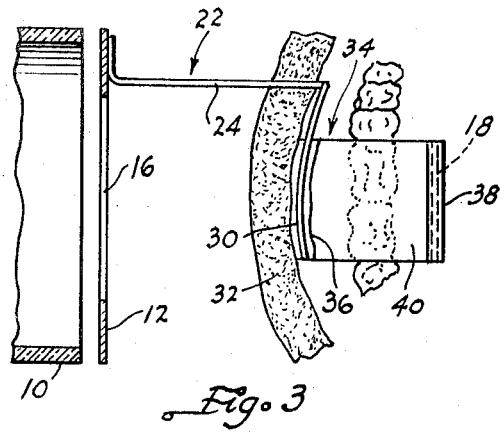
FIG. 3 is a horizontal sectional view of the apparatus and fragmentary anatomy of a patient's jaw as seen on the line 3—3 of FIG. 1.

The outer ends of the legs 24 are preferably provided with oppositely extending extensions 28 and, to the outer ends of each of these extensions, laterally extending arms 30 are connected integrally. The arms 30 preferably are substantially parallel to each other and are spaced apart a greater distance in a vertical direction than the vertical dimension of the X-ray film 18, for example. Further, the arms 30 preferably are slightly curved in plan view as shown in FIG. 3, to conform generally to the exemplary inner surface of the cheek 32 of a patient. Also, by such arrangement, the arms 30 are slightly resilient for purposes to be described.

Still further in accordance with the present invention, several embodiments of connecting means are provided for purposes of attaching the various possible types and sizes of X-ray film to the bracket means 22 and, through said means, to the shield and aiming member 12. In the embodiment illustrated in FIGS. 1 through 4, the connecting means 34 preferably is non-metallic and flexible and, in cross-section, or end view, somewhat resembles an I-beam, as is apparent from FIGS. 1 and 4. This particular embodiment of connecting means preferably is provided with relatively flat tubes or channels 36 and 38, respectively comprising bracket attaching means and film attaching means, which are interconnected by a preferably flexible web or bite means 40 comprising a preferably integral connection for the tubes 36 and 38 so as to hold them in spaced coextensive relationship.

It is intended that the connecting means 34 preferably be made of inexpensive material so as readily to be expendable. One suitable material is paper of appropriate thickness and durability. Another form of material would be one of any of a number of types of sheet-like synthetic resin such as the various regenerated cellulose types, polyethylene and the like. If desired, the connecting means 34, especially when formed from synthetic resin, may be molded by extrusion and appropriate lengths of the continuous extrusions can be cut off and, if necessary, otherwise suitably cut further so as to be adapted to the film to be held thereby.

As is apparent from FIG. 1 particularly, the width of the tube 36, between the upper and lower edges thereof, as considered in normal use, is substantially equal to, but preferably a little less than, the distance between the lateral arms 30 which slidably are received within the upper and lower folds of the sleeve 36 and slightly compresses said arms toward each other to provide frictional engagement therebetween. Flexibility of the sleeve 36 readily conforms to the curvature of the arms 30, as generally shown somewhat diagrammatically in FIG. 3. The bite web or means 40, if desired, may be shorter than the length of the sleeve 36 as well as the length of the sleeve 38. Further, the bite web 40 may be laterally offset more to one end than the other of the sleeves 36 and 38, for example, if desired.

Sleeve 38 is dimensioned so as preferably to slidably receive a relatively stiff rectangular X-ray film 18, for bitewing use, with a limited amount of friction, so as to effectively hold the film within the connecting means 34 relative to the space between the arms 30 and substantially centrally thereof. As a result, only non-metallic substances will be disposed between the opening 16 and the film 18, all of the metallic structure which might cause interference being outside of the boundary of the longitudinal space defined by and extending between the opening 16 and the film 18, as outlined by the exemplary boundary lines 20 explained above.

Due to the positions of the bite means 40, which is preferably flexible and web-like, between the teeth of the opposed jaws of the patient for engagement thereby, as illustrated in exemplary manner in FIGS. 1 and 3, the film 18 is held operatively positioned by the teeth so as to be intersected substantialy centrally by the central axis of the opening 16 in shield member 12, such axis coinciding substantially with the central axis of the X-ray cone 10, regardless of which type or shape of cone is employed. The shield member 12, after being positioned within the mouth of the patient by the dentist and also after showing the patient where the dentist desires the patent to hold the shield member 12 by means of one of the handles 14, it will be seen that the combination dental X-ray shield and film holder comprising the present invention is supported entirely by the patient.

The accurate relative positioning of the shield and film likewise is reasonably assured due to sliding the sleeve 36 onto the spaced arms 30 until the ends of the arms are even with the outer edge of sleeve 36. Film 18 is centered with respect to sleeve 38, as shown in FIG. 3. The interengagement between said upper and lower vertically spaced arms with the inner surfaces of the cheek 32 of the patient establishes operable intra-oral positioning of the sleeve 38 and the film therein. Such opposite edges of the sleeve 36 and the arms 30 therein are somewhat between the cheek and gums of the patient so as even further to insure reasonable stability of the combination X-ray shield and film holder when held by the patient as described above. Also, the flexibility of the bite means 40 permits the same to be conformed to the irregular tooth surfaces engaging the bite means, thereby crenelating and fore-shortening the same and thus drawing the film and arms 30 into closer engagement with the teeth and gums.

Figure 5:
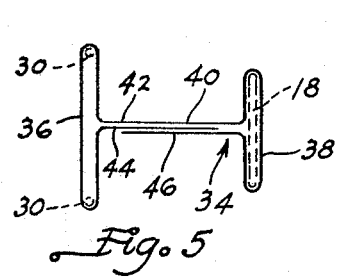
FIG. 5 is an end view of one embodiment of connecting means to secure an X-ray film to the bracket of the X-ray shield and aiming element.

In FIG. 5, the connecting means 34 is shown as being formed from flexible sheet material, such as paper, for example, the material being folded appropriately to form the sleeves 36 and 38 and overlapping layers of the material are formed to extend transversely between said sleeves so as to constitute the preferably flexible bite means 40. The various layers 42, 44 and 46 are connected together by appropriate cement, glue, or other means of a non-metallic nature. Such arrangement is extremely inexpensive and therefore readily expendable.

If desired, the particular embodiment of connecting means 34 shown in FIG. 5 may be formed permanently with the film 18 and fabricated therewith by the manufacturer of the X-ray film. Also, while said embodiment preferably is constructed so as to accommodate film for periapical use, such use is not necessarily to be restricted to use with this type of film. Also, while paper has been mentioned as being a suitable material for forming the embodiment of connecting means shown in FIG. 5, other materials including any of a number of different kinds of synthetic resins, certain examples of which have been mentioned above, may be utilized.

Figure 6:
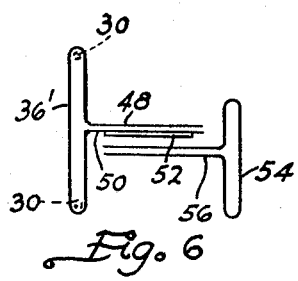
FIG. 6 is a slightly exploded view of another embodiment of connecting means attachable particularly to a bitewing type X-ray film by pressure-sensitive cement or otherwise, the components of the connecting means being shown in position ready to be connected to each other.

FIG. 6 illustrates, in slightly exploded form, a slightly different type of connecting means in which the sleeve 36' may be formed of various folded panels of inexpensive, non-metallic sheet-like material such as paper, synthetic resin, or the like so as to constitute a formation which, in end view, is generally in the nature of a T, thereby providing a pair of overlapping layers 48 and 50, which may be secured together appropriately by glue or cement and a layer of pressure-sensitive cement 52 may be provided thereon and suitably protected until ready for use by any commonly employed means such as a sheet of waxed or varnished paper. For example, if desired, the adjacent surface of the sleeve 36' may be suitably treated to render the same non-adhering to the layer 52 of cement, whereupon the connected layers 48 and 50 which form part of the bite means of this embodiment of the invention, may be folded into flat arrangement with one of said surfaces of tube 36' so as to dispose the layer of cement 52 thereagainst for protection.

Further in accordance with the principles of the invention with respect to the embodiment shown in FIG. 6, the X-ray film 54 may be of the bitewing type and the wings 56 thereof, when the film is ready for use, may be extended perpendicularly from the film and connected to the overlapping layers 48 and 50 by the layer 52 of pressure-sensitive cement upon said layers 48 and 50 being pressed into firm engagement with the wings 56 of the film so as to form a composite laminated, flexible bite means extending perpendicularly and transversely between the relatively flat sleeve 36' and the film 54.

Figure 7:
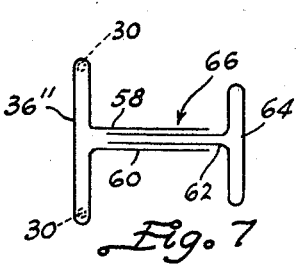
FIG. 7 is still another embodiment of connecting means suitable particularly for use with bitewing type X-ray film but connected in a different manner thereto than in the embodiment shown in FIG. 6.

A still further embodiment of connecting means which is slightly different in construction but embodying the same basic structural elements of the preceding embodiments, is illustrated in FIG. 7 in end view. In this embodiment, the relatively flat tube 36" may be formed from material similar to that described above with respect to the tubes 36 and 36' in the preceding embodiment. Tube 36 also may be provided with folded, parallel layers 58 and 60 arranged so as to have a slight space therebetween and through the medium of pressure-sensitive cement or other types of securing means of a non-metallic nature, the layers 58 and 60 may be connected either to the wings 62 of a bitewing type film 64, so as to form a flexible laminated bite means 66 extending transversely between the film and sleeve 36", or the layers 58 and 60 may be laminated with one or more folded layers extending from flexible tube-forming means, similar to tube 38 of the embodiment shown in FIG. 5 for example, for purposes of accommodating an X-ray film therein for periapical use.

In order to render the present invention relatively universal with respect to different sizes and shapes of available X-ray film now currently and commonly employed in the making of dental X-ray pictures or exposures, reference is directed to FIGS. 8 and 9 of the drawings in which substantially identical shield and aiming means 12 are shown such as also is illustrated in FIGS. 1 through 3, the same having supporting handles 14 thereon. These shield members 12 also have affixed thereto the bracket means 22 of the same type as illustrated in FIGS. 1 through 3 and having a substantially parallel lateral arms 30 extending transversely from the bracket means and maintained in spaced relationship from the rear surface of the shield and aiming means by reason of the attaching foot 26 of the bracket means 22 being securely fixed by welding or otherwise to said surface of the shield and aiming means 12.

By inspection of FIGS. 8 and 9, it will be seen that the shield member 12 of FIG. 8 has a different shape of opening 16' therein from the opening 16" in the shield 12 shown in FIG. 9. However, the bracket means 22 in both of said figures is identical. The openings 16' and 16" in these figures are formed preferably substantially centrally of the shield members 12 and the arms 30 of the bracket means 22 in each of these figures are so positioned that said arms of the bracket means are spaced equal distances respectively above and below the horizontal central axis of the openings 16' and 16". Similarly, the unconnected outer ends of the arms 30 extend equal distances beyond the vertical axes 68 of the openings 16' and 16", as viewed in these figures when held in upright position.

In order to provide simple but effective connecting means which may universally be used with either of the embodiments of openings 16' and 16" as illustrated in FIGS. 8 and 9, and without restriction to these two specific types and shapes of openings, the present invention contemplates the use of a simple strip of flexible material 70 which, by way of example, may conveniently be of the order of 1 inch wide, more or less. Suitable material may comprise paper of appropriate thickness and resilience, or flexible, sheet-type plastic material of appropriate thickness and composition may be used, substantially as described above with respect to the connecting means 34 illustrated in FIGS. 1–6.

Figure 4:
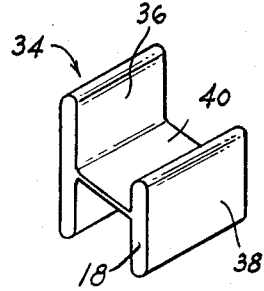
FIG. 4 is a perspective exemplary view of one form of connecting means by which an exemplary X-ray film is secured to the bracket of the X-ray shield and aiming element, as illustrated in the preceding figures.
Figure 12:
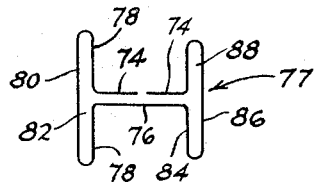
FIG. 12 is an end view of the connecting means of FIG. 11 shown in folded condition.

The material 70, when cut into uniform widths of strips and of similar lengths, preferably is scored along lines 72 to facilitate the bending of the material and also to define panels 74 and 76 which are to be glued or cemented, the panels 74, at opposite ends of the strips, overlapping the central panel 76, as seen from FIG. 12 when the strip has been folded into position of form connecting means 77 which is similar in configuration to the connecting means 34 shown in FIGS. 4, 5 and 7. The panels 74 and 76 may be affixed to each other by glue or cement similar to that described with respect to the preceding embodiment shown in FIGS. 4–7, including the use of pressure-sensitive cement if desired.

The folding of the strip of material 70 to form the configuration of connecting means 77 shown in FIG. 12 comprises the folding of short panels 78 onto the intermediate panel 80 to form a flat tube 82 into the opposite ends of which the lateral arms 30 are slidably disposed in order to support the connecting means thereon. As is apparent from FIG. 11, the right-hand portion of strip 70, as viewed in said figure, comprises another pair of short panels 84 respectively disposed on the opposite sides of intermediate panels 86. When the short panels 84 are folded onto the intermediate panel 86 from opposite edges thereof and the panel 74 is glued to the panel 76, another flat sleeve 88 is formed which frictionally and slidably receives an appropriate size of X-ray film, especially the type adapted for periapical use.

By selecting the width of the strip of material 70 so as to be substantially twice that of the length of the arms 30 which extend between the vertical axes 68 of the openings 16' and 16", and the ends of said arms, such strips, when folded to form the connecting means 77 as illustrated in FIG. 12, readily may be slidably mounted upon the arms 30 of either of the shield members 12 respectively shown in FIGS. 8 and 9 until the outer ends of the arms are coextensive, for example, with the left-hand edges of the holding means 77 as viewed in FIGS. 8 and 9. Such an arrangement will dispose the holding means centrally of the openings 16' and 16", regardless of the width or height of the openings 16' and 16". Then, by centering the film in the flat tube 88 of the holding means 77, especially in a transverse direction, said film would be perfectly axially aligned with the openings 16' and 16".

It is to be understood that in regard to accommodating X-ray film of different heights within the connecting means 77, the panels 84 and 86, as well as the resulting flat tube 88 formed thereby will have to be dimensioned suitably to accommodate the different heights of films but, inasmuch as there are at present only three or four popularly used sizes and shapes of X-ray films, maintaining an appropriate inventory of the strips 70 for quickly and inexpensively forming such holding means is not unduly burdensome or expensive, either from the standpoint of the dealer or the user.

Figure 14:
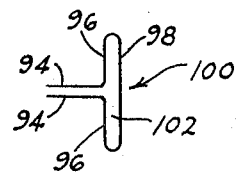
FIG. 14 is an end view of the connecting means of FIG. 11 shown in folded condition.
Figure 13:
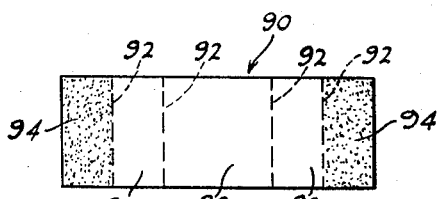
FIG. 13 is a plan view of another embodiment of connecting means shown in unfolded condition.

In order to adapt the above-described principle of forming from strip material of uniform widths connecting means attachable to conventional bitewing film such as exemplary film 64 shown in FIG. 7, for example, attention is directed to FIGS. 13 and 14 in which a strip 90 which may be of the same material as that from which strip 70 is formed, preferably has substantially the same width as strip 70 but is substantially shorter. The strip is provided with multiple, preferably parallel scorings 92 to define end panels 94 which may be coated with appropriate cement, of the pressure-sensitive type, or otherwise, whereby when the relatively short panels 96 are folded onto intermediate panel 98, the shape thereof is substantially that of a T, in end view, as shown in FIG. 14, thereby comprising an inexpensive connecting means 100 readily and quickly connectable to the conventional wings of a typical bitewing type film, either at the time of use, or otherwise. If intended for application at the time of use, it is preferred that the cement applied to the end panels 94 preferably be of the pressure-sensitive type which is suitably protected until ready for use when it is to be adhered to the wings of bitewing type X-ray film. Further, if desired, the connecting means 100 may be attached to bitewing type film at the time it is manufactured.

Figure 11:
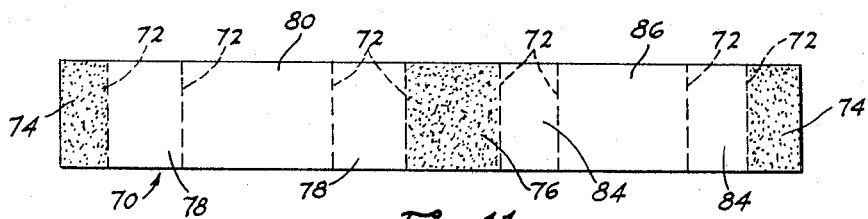
FIG. 11 is a plan view of one unfolded embodiment of connecting means illustrating fold lines and areas to be connected.

As in regard to the strip 70 illustrated in FIG. 11, and the corresponding connecting means 77 illustrated in FIG. 12 which is formed therefrom, the connecting means 100 readily is capable of being centered with respect to the openings 16' and 16", for example, of the shield members 12 respectively shown in FIGS. 8 and 9, regardless of the fact that the openings 16' and 16" are of different areas and shapes. Even though the connecting means 70 and 100 may not be equal in width to that of the X-ray films to which they are connected, if the films are centered relative to the flat tube 88 of connecting means 77 or the bitewing film to which the connecting means 100 is attachable, the film automatically would be centered with respect to the openings 16' and 16" if the holding means is attached to the arms 30 of the shield members 12 in the manner described above, whereby the righthand edges of the connecting means, as viewed in FIGS. 8 and 9 are coextensive with the outer ends of the arms 30.

With respect to the connecting means 100 illustrated in FIGS. 13 and 14, it is to be understood that the flat tube 102 formed by the folded panels 96 and 98 is for purposes of receiving the arms 30 in the outer extremities of the flat tube 102 when the holding means 100 is connected to bitewing type film. Under such circumstances, particularly where it is intended that the arms 30 shall be uniformly spaced transversely apart on all of the various shield members 12, regardless of the sizes and shapes of openings formed therein, and especially due to the fact that the flat tube 102 is connectable to said arms, the connecting means 100 may be used universally with all of the conventional different sizes and shapes of bitewing type X-ray films for connecting the same to the shield member 12 and especially the arms 30 thereon.

It is to be understood that although a number of different specific embodiments of connecting means have been illustrated in the drawings and described above with respect to FIGS. 5, 6 and 7, and FIGS. 11-14, it is not intended that such specific embodiments by any means exhaust all various possibilities of different ways of folding strips of material to form connecting means which might conceivably be designed and used within the purview of the present invention.

The above-described embodiments of X-ray film holder means comprising both an X-ray shield and aiming device, a bracket, and connecting means by which an X-ray film may be mounted easily and accurately in operative relationship with respect to the bracket and X-ray shield and aiming means function quite satisfactorily in the oral cavity of most patients. However, there are certain patients, and particularly children whose oral cavities have not fully developed in size, who possibly may find difficulty accommodating the curved arms 30 connected to legs 24 of the bracket means 22, particularly in view of the length of the arms 30. Accordingly, especially in order that the present invention might readily be adapted to patients in the latter category who can not comfortably and readily accommodate the arms 30 as well as the connecting means 34 and other embodiments thereof shown for example in FIGS. 5-7, 12 and 14, attention is directed to the still further embodiment illustrated in detail in FIGS. 15-20, which details will now be described.

In addition to rendering the mechanism more readily adapted to the oral cavities of certain patients and especially children, the embodiment of the invention illustrated in FIGS. 15-20 further embodies certain manufacturing advantages through simplification of construction, details of which are set forth hereinafter.

In FIG. 15, which is a front face view of said further embodiment of the invention, the combination shield and aiming device 12 is employed, the same being provided with diametrically opposed handles 14 which normally extend substantially vertically in use, one of said handles readily being positioned to be held by a patient or dental assistant so as to position the shield 12 accurately with respect to the exterior of the face of a patient upon whom the X-ray is to be employed. As in the preceding embodiments, the shield and aiming device 12 is formed preferably from metal, such as stainless steel, which prevents the passage of all but an infinitesimal amount of X-rays therethrough when X-rays are projected against the same. Further, for simplicity in description, the combination shield and aiming device 12 will be hereinafter referred to as a shield.

The shield 12 also is provided with a preferably rectangular opening 16. Said opening preferably is approximately the same size and shape as the film 18 which is to be associated in operative relationship with respect to the shield 12. Said film, essentially, is conventional X-ray film, preferably of the periapical type. Due to the nature of the supporting means, however, it may be used for bitewing purposes. As in regard to the preceding embodiments, a limited number of different shields 12 should be available to a dentist, each respectively having a different size or shape of opening 16 therein so as to accommodate an appropriate size and shape of film corresponding to that of the opening. The basic principles of support and utilization however are the same in regard to all sizes and shapes.

The embodiment of FIGS. 15-20 differs from the embodiments of the invention shown in the preceding figures primarily in regard to the bracket and connecting means by which the film is operatively associated with the shield 12. In this regard, attention is directed particularly to FIGS. 15 and 16, wherein it will be seen that the bracket 104 has an attaching foot 106 which is bent approximately at a right angle to the bracket 104 and is secured, such as by spot welding, against the inner face of the sheet-like metallic shield 12. Said bracket and foot are formed inexpensively from strip stock of appropriate gauge and width, the same preferably being stainless steel or some similar alloy which readily can be sterilized by autoclaving or by using any other appropriate form of sterilization, including so-called cold types. If desired, the bracket 104 may be rendered more rigid with respect to shield 12 by impressing an appropriate, diagonal bracing dent 108, such as by a forming press, in the bend which connects foot 106 to bracket 104.

Connected to the outer end of bracket 104 is transversely extending means comprising a U-shaped member 110 which preferably is formed from stainless steel wire or equivalent material of appropriate size. The member 110 is disposed within a plane substantially parallel to shield 12 but transverse to bracket 104. The outer end of bracket 104 is fixedly secured to the bite portion 112, preferably midway between the ends thereof, by spot-welding or other appropriate means of connection.

The attaching foot 106 of bracket 104, as can best be seen from FIGS. 15 and 16, is secured to shield 112 relatively closely to one side of the opening 16 whereby, particularly as can be seen from FIG. 15, the U-shaped member 110 is approximately aligned with respect to said one end of opening 16 and portions of the two sides of the opening extending away from said one side of said opening. Thus, it will be seen that the arms 114 of member 110 are parallel to and partially coextensive in length with the longer sides defining opening 16.

Preferably, the arms 114 terminate just slightly past the mid-portions of said parallel sides of opening 16 as can be readily seen from FIG. 15. In this respect, therefore, the arms 114 preferably are straight and also are substantially shorter than the arms 30 in the embodiment illustrated in the preceding figures. However, as in said preceding embodiments, the member 110 is aligned with the axis of the opening 16, i.e., the axis which extends perpendicularly therefrom to the plane of shield 12, and said U-shaped member 110 otherwise is partially coextensive with the perimeter of the opening 16 but no portions of the member 110 overlie said opening. Hence, they do not interfere in any way with the passage of X-rays through said opening from the cone 10 of the X-ray machine to the film 18.

This additional embodiment also employs connecting means which, in general, are made from the same type of material as the connecting means 34 and other embodiments thereof such as shown in FIGS. 3–9 and 10–13 but a different underlying principle is employed in the connecting means to be used in conjunction with the embodiment of FIGS. 15–20. In this regard, attention is directed to FIG. 19, wherein an end view of the connecting means 116 is shown which comprises a relatively large sleeve 118 which slidably and frictionally receives, in its opposite ends, the arms 114; an intermediate flexible web 120 comprising bite means which is engaged between the upper and lower teeth of the patient as shown in plan view in exemplary manner in FIG. 16; and a smaller sleeve 122 which slidably and frictionally receives the X-ray film 18, thereby holding the film substantially in parallelism with the plane of the U-shaped member 110. As in regard to the preceding embodiments, the sleeve 118 comprises bracket attaching means and sleeve 122 comprises film attaching means.

Preferably, the connecting means 116, which is intended to be expendable after each use, is formed from relatively inexpensive material such as a reasonably heavy grade of paper stock. Said connecting means also, in flattened and unused condition, resembles a flattened tube cut somewhat on the bias, as shown in plan view in FIG. 7 but the opposite long edges thereof being parallel. In forming the means 116, a sheet of paper stock, substantially as wide as the unfolded view of the connecting means as illustrated in FIG. 18, is selected but the same is initially of indefinite length. It will be understood that FIG. 18 merely shows a cut strip of the flattened tubular paper member in unfolded condition.

Such width of stock is initially scored longitudinally with major fold lines 124 and 126 and a plurality of minor fold lines 128, 130 and 132. This arrangement provides a major, central panel 134 and two side panels 136 and 138 which are not of equal length, due to the different widths of the sleeves 118 and 122, but are folded along the fold lines 124 and 126 onto the central panel 134, meeting midway of the central portion 140 of central panel 134. The tab portions 142 are suitably pasted or glued to central portion 140 and this is the only securing means required in the entire connecting means 116.

After a folded assembly of indefinite lengths of said sheet material has been formed as thus far described, sections thereof of appropriate length, with parallel opposite ends as shown in FIG. 17, are cut from the folded assembly when in flat condition and a bundle of predetermined number of said cut members are packaged for sale. Hence, manufacturing operations are minimal and cost is correspondingly low. The dentist or X-ray technician receives said connecting means in such flattened condition and when the same are to be used, the following operations are performed.

Whereas the opposite end portions of the flattened connecting means 116 which are illustrated in FIG. 17 actually comprise flat sleeves, said initially flat sleeves are upset or re-shaped by flattening the major folds 124 and 126 so that the panels connected thereby are commonly disposed substantially in flat planes as shown in FIGS. 19 and 20 and thereby form the flattened sleeves 118 and 122 so as to dispose the same in parallelism with each other, interconnected by the flexible intermediate web 120. Such rearrangement is effected by re-folding the various panels by creasing the same along the minor fold lines 128, 130 and 132.

The biased or diagonal arrangement of the flattened connecting means 116, as viewed in FIG. 17, is for a very beneficial purpose, primarily adding comfort to the patient and particularly to render the present invention highly suitable for use in the mouths of children or other persons whose oral cavities are too small to readily accommodate the arrangement of the embodiment shown in FIGS. 1–14. This embodiment becomes apparent when the connecting means 116 has been transformed from the flattened condition shown in FIG. 17 to the expanded and re-shaped arrangement shown in FIG. 20 for example and also as illustrated in side view in FIG. 16.

In view of the fact that the U-shaped member 110 must be accommodated within the oral cavity so as to dispose the same adjacent the inner wall of the cheek 114 and rearwardly of the lips 146, arranging the member 110 so as to have relatively short arms 114 in comparison with the longer, curved arms 30 of the preceding embodiments, more comfortably adapts the member 110 to the oral cavity and also facilitates mounting the connecting member 110 upon arms 114. However, to facilitate the placement of the X-ray film 18 adjacent the inner surfaces of the posterior teeth and especially the first and second molars 148 and 150, whereby X-rays projected through opening 116 will pass through the bone, tooth structure and flesh immediately in front of the film 18, it is essential that the film 18 be held in an offset position with respect to the member 110. This is readily accomplished by the biased or diagonal arrangement of the connecting means 116 as can be seen particularly from FIG. 16.

The particular arrangement of the connecting means 116 also facilitates the accurate alignment of the film 18 axially with respect to the opening 16 in shield 12. In this regard, it will be observed that when the connecting means 116 is transformed from the flat condition of FIG. 17 to the re-shaped condition of FIGS. 19 and 20, the relatively large sleeve 118 has a leading point 152 thereon. Thus, when sleeve 118 is slidably connected to arms 114 of member 110 by being received within the folded portions along the lines 128, it will be seen from FIGS. 16 and 20 that said leading point 152 will abut bracket 104. This, therefore, limits such connecting movement and positions the sleeve 118 in its operative position with respect to the member 110.

In this position the ends of the arms 114 are substantially even with the outer end of sleeve 118. The intermediate web 120 also extends inwardly and rearwardly with respect to sleeve 118 when disposed in the oral cavity. Also, the sleeve 122, due to its diagonal configuration, is positioned an even greater distance rearwardly into the oral cavity. Hence, when the opposite edges of the film 118, which are slidably positioned relative to the edge folds 130 of sleeve 122, are centered with respect to said opposite folded edges 130, as seen in FIGS. 15 and 16, the operator or attendant will known that the film 18 is centered axially with respect to the opening 16.

The intermediate web 120 preferably is reasonably stiff but preferably not so stiff as to subject the patient's teeth to damage when gripping said web between the upper and lower teeth at one side of the jaw of a patient for example. Further, the web is of a limited length between the sleeves 118 and 122 when in the position shown in FIGS. 16, 19 and 20, whereby when disposed in the oral cavity, and particularly when somewhat crenelated and therefore foreshortened by engagement between the occlusal surfaces of the patient's teeth, it will hold the X-ray film 18 in operative position with respect to both upper and lower teeth of the patient, similar to the manner in which a bitewing X-ray film is held in accordance with conventional means. Under such circumstances, the film 18 is held satisfactorily in fixed position within the oral cavity and, similarly, the disposition of the sleeve 118 against the inner surface of the cheek 144 or lips 146, depending upon whether posterior or anterior teeth are being X-rayed, serves to aid in positioning the shield 12 and especially the opening 16 therein in proper alignment with the film 18.

From the foregoing, it will be seen that the present invention provides a number of embodiments of improved dental X-ray shield and film holding means incorporating simple but meritorious bracket means arranged to be quickly and readily attached to inexpensive, expendable connecting means positionable between opposing teeth of the patient and comprising bite means to which X-ray film either is directly connected or may be quickly positioned operatively relative to said bite means. Hence, the X-ray film may be entirely supported accurately and easily by the patient in a manner which will minimize the patient being subjected to possible injury from scattered and surplus X-rays which are absorbed by the shield means and only the useful X-rays to which the film actually is to be subjected pass through the opening provided in the shield manner.

While the invention has been described and illustrated in its several preferred embodiments, it should be understood that the invention is not to be limited to the precise details herein illustrated and described since the same may be carried out in other ways falling within the scope of the invention as claimed.

I claim:

1. An X-ray film holder comprising in combination, substantially plate-like X-ray shield and aiming means arranged to be positioned exteriorly of a patient's face and adjacent the outer end of the cone of an X-ray machine, said shield and aiming means being at least equal in area and shape to that of the cone of an X-ray machine and having an opening of restricted size therethrough of substantially similar shape and area to that of X-ray film to be used with said holder to effect collimation of the X-ray beam, bracket means connected at one end to and extending perpendicularly from one face of said shield and aiming means, the other end of said bracket having supporting means spaced apart a distance greater than the width of said opening in said shield and aiming means, and non-metallic connecting means having film attaching means and bracket attaching means on opposite ends of intermediate bite means, said film attaching means and bracket attaching means being attachable to and readily detachable from an X-ray film and the supporting means on the other end of said bracket means respectively thereby to position the film in axial alignment with said opening in said shield and aiming means and also with the cone of said X-ray machine when said bite means of said connecting means is engaged supportingly between upper and lower teeth of a patient, whereby no metallic means on said bracket or connecting means are disposed between said opening in said shield and said X-ray film when the film is supported by said film attaching means.

2. The X-ray film holder according to claim 1 in which said opening is positioned substantially centrally of said shield and aiming means and said non-metallic connecting means is aligned substantially axially with said opening.

3. The X-ray film holder according to claim 1 in which said supporting means on the other end of said bracket means has a pair of transversely extending substantially parallel supporting arms thereon and the bracket attaching means on said connecting means is a sleeve-like means substantially complementary to said transversely extending supporting arms and slidably engageable therewith for support thereby.

4. The X-ray film holder according to claim 3 in which said film attaching means on said connecting means comprises additional sleeve means arranged to receive an X-ray film slidably for support thereby in operative position axially aligned relative to said opening in said shield and aiming means so as to be subjected to X-rays discharged through said opening.

5. The X-ray film holder according to claim 3 in which said sleeve-like means is permanently connected to an X-ray film.

6. The X-ray film holder according to claim 3 in which said transversely extending supporting arms are spaced vertically in use and are similarly curved longitudinally substantially to conform to the curvature of the inner surface of the cheek of a patient and said sleeve-like bracket attaching means on said connecting means being slidable onto said arms and flexible so as readily to conform to the curvature of said arms.

7. The X-ray film holder according to claim 3 in which said transversely extending supporting arms comprises a substantially U-shaped member secured to said other end of said bracket means and substantially parallel to said shield and aiming means, the arms of said U-shaped member being substantially parallel to and aligned with opposite edges of said opening in said shield and aiming means in a direction perpendicular to said bracket means and arranged to slidably receive said sleeve-like bracket attaching means on said connecting means until said sleeve-like means contacts said bracket means, thereby to limit such sliding movement and accurately align X-ray film axially with said opening in said shield and aiming means when such film is supported by said film attaching means.

8. The X-ray film holder according to claim 7 in which said bracket is adjacent one of the edges of said opening extending between said edges to which said arms of said transversely extending supporting means are parallel and said arms being shorter than said latter edges of said opening to minimize discomfort to a patient when said arms and connecting means are positioned in the oral cavity of a patient.

9. The X-ray film holder according to claim 8 in which said film attaching means on said connecting means comprises an additional sleeve-like means parallel to the sleeve-like bracket attaching means which receives said arms on said bracket means, said additional sleeve-like means being suitably dimensioned to slidably receive an X-ray film of conventional type and position the same substantially parallel to said shield and aiming means and in axial alignment with the opening therein, whereby when such film is centered relative to said additional sleeve-like means it will also be axially aligned accurately with said opening.

10. The X-ray film holder according to claim 9 in which said intermediate bite means extends diagonally in one direction to the axis of said opening thereby to position an X-ray film offset relative to said arms of said bracket attaching means and axially aligned with said opening when one end of said sleeve-like means which receives said arm abuts said perpendicular bracket means.

11. The X-ray film holder according to claim 9 in which said connecting means initially comprises a diagonally cut section of flattened flexible sheet material of substantially uniform widths and said sleeve-like film and bracket attaching means initially are flattened and are connected by said intermediate bite means, said diagonally cut section being narrower than the length of an X-ray film to be received by and centered relative to one of said sleeve-like attaching means when re-shaped from flattened condition to form a flat tube transverse to said intermediate bite means, whereby when said other flattened sleeve-like means thereof is similary re-shaped it can be mounted slidably upon the arms of said U-shaped supporting member until one end of said other sleeve-like means engages said perpendicular bracket and thereby positions the X-ray film in accurate alignment axially with said opening in said shield and aiming means.

References Cited by the Examiner

UNITED STATES PATENTS

| | | | |
|---|---|---|---|
| 1,974,936 | 9/1934 | Vloch | 250—70 |
| 2,075,491 | 3/1937 | Wilson | 250—70 |
| 2,612,609 | 9/1952 | Bowser | 250—70 |
| 3,092,721 | 6/1963 | Medwedeff et al. | 250—70 |

RALPH G. NILSON, *Primary Examiner.*

WALTER STOLWEIN, *Examiner.*

W. F. LINDQUIST, *Assistant Examiner.*